United States Patent [19]

Riemer et al.

[11] Patent Number: 5,254,150

[45] Date of Patent: Oct. 19, 1993

[54] ALIGNMENT APPARATUS FOR A GOB DELIVERY SYSTEM

[75] Inventors: Robert F. Riemer, Andover, Mass.; David Braithwaite, Tyne and Wear, United Kingdom

[73] Assignee: VHC, Ltd., West Palm Beach, Fla.

[21] Appl. No.: 857,339

[22] Filed: Mar. 25, 1992

Related U.S. Application Data

[63] Continuation-in-part of Ser. No. 769,924, Sep. 30, 1991, Pat. No. 5,213,602.

[51] Int. Cl.$^5$ .............................................. C03B 7/16
[52] U.S. Cl. ........................................ 65/225; 65/304
[58] Field of Search .......................... 65/304, 303, 225

[56] References Cited

U.S. PATENT DOCUMENTS

| | | |
|---|---|---|
| 1,911,119 | 5/1933 | Ingle . |
| 3,341,315 | 9/1967 | Patschorke . |
| 4,417,915 | 11/1983 | Dahms .............................. 65/304 |

Primary Examiner—Joye L. Woodard
Attorney, Agent, or Firm—Woodard, Emhardt, Naughton, Moriarty & McNett

[57] ABSTRACT

A gob guide apparatus for guiding the delivery of gobs of molten glass between a gob distributor scoop and a blank mold opening of a glassware forming machine. The apparatus includes a deflector, a trough pivotally mounted at its upper end to the machine frame and extending downwardly between the scoop and the deflector so that its lower end is aligned along a first axis, a holder mounted to the machine frame receiving the lower end of the trough, and a deflector exit adjustment means for pivotally adjusting the angular position of the lower end of the deflector relative to the entrance of the blank mold opening. The holder includes a carriage having first and second adjustment means for permitting respective longitudinal and transverse movement of the deflector relative to the first axis with the holder maintaining centerline alignment between the upper end of the deflector and the lower end of the trough during the movement of the deflector.

3 Claims, 3 Drawing Sheets

ALIGNMENT APPARATUS FOR A GOB DELIVERY SYSTEM

REFERENCE TO RELATED APPLICATIONS

This application is a continuation-in-part of U.S. patent application Ser. No. 07/769,924, filed on Sep. 30, 1991, now U.S. Pat. No. 5,213,602, having a common inventive entity, and entitled Improved Alignment Apparatus.

BACKGROUND OF THE INVENTION

FIELD OF THE INVENTION

The subject invention relates generally to glassware forming machines, and more particularly to an apparatus for ensuring consistent and accurate delivery of gobs of molten glass to the blank mold of an individual section (I.S.) type glassware forming machine.

Machines for molding glass bottles usually include a plurality of molds above which is placed a reservoir of molten glass. Glass passes from the reservoir in a slow stream and is sheared into gobs for sequential direction to the respective blank molds.

Typically a gob distributor located just below the shears directs a gob into the guide trough of a respective mold, the gob sliding under gravity and being deflected to fall vertically into the blank mold. The gob distributor then indexes to another position for delivering the subsequent gob and the timing of the machine is arranged to deliver gobs of glass to each mold in regular sequence. Hitherto, the method of aligning the gob guide trough and deflector has been relatively crude thus leading to imprecise guidance of the gob and the possibility of nonvertical entry into the blank mold.

Typically each part of the apparatus for guiding the gob from the gob distributor to the mold is separately mounted on the machine frame. Further, the position of each part is separately adjustable to permit accurate alignment of adjacent parts, the trough being pivotally adjustable up and down while the deflector adjusts vertically and horizontally relative to the machine frame. Horizontal adjustment of the deflector results in pivotal movement of the trough in a horizontal plane. In practice, alignment is often time consuming since adjustment of the position of one part of the apparatus affects the position of adjacent parts. The method and means for aligning the gob delivery apparatus have remained largely unchanged for many years. An example of a conventional gob delivery system having an alignment apparatus of the type just described is disclosed in U.S. Pat. No. 3,341,315 to Patschorke.

A significant improvement to the alignment apparatus of conventional gob delivery systems is provided in the co-pending parent application Ser. No. 07/769,924. In that application there is disclosed a gob guide apparatus including a trough and a deflector which are position adjustable so as to permit corrective alignment of the position of the exit end of the deflector over the blank mold while maintaining the centerline alignment of the trough and deflector. This is accomplished by pivotally mounting the entrance end of the trough to the machine frame so as to permit horizontal pivotal movement of the trough and deflector essentially as a unit, while also permitting the deflector position relative to the trough to be adjustable in a direction towards or away from the trough along an axis generally coincident with the trough centerline. While providing significant advantages over the conventional alignment systems, this design is somewhat costly in situations requiring retrofitting to existing machines because of the necessity of installing a new deflector. A new deflector is required because a different mounting is used to journably mount the deflector to the carriage. The subject invention provides the advantages of the previous design while permitting the use of the existing deflector.

A further disadvantage of previous gob delivery systems involves the positional control of the gobs on the deflector. Ideally, the scoop, trough and deflector are aligned and oriented so that a gob entering the deflector travelling in a non-vertical direction will be guided along the deflector so as to exit the deflector vertically. For this purpose, the contour of the deflectors are manufactured to very tight tolerances and are ground to shape by hand. Nevertheless, no two deflectors are exactly alike in shape and consequently it has been found that a deflector which is otherwise precisely aligned with the trough and the center of the blank mold opening may have its exit end oriented so that gobs exit the deflector slightly skewed from the desired vertical orientation. Hitherto, the only adjustments which could be made to compensate for this problem involved moving the deflector exit horizontally off center relative to the blank mold opening. Although such adjustments provide some degree of compensation, performing the adjustments can be a time-consuming task of trial and error and further adjustments may be necessary when the molds are changed. The present invention addresses these problems by providing the deflector with a pivotal adjustment capability which adjusts the exit angle so as to permit the gobs to exit the deflector in a vertical direction. While an alignment system having a deflector exit pivotal adjustment capability is not in itself new, the combination of such feature in an alignment system which maintains centerline alignment between the deflector and trough provides alignment capabilities not heretofore found in previous systems.

SUMMARY OF THE INVENTION

According to one aspect of the present invention, there is provided an improved gob guide apparatus for guiding the delivery of gobs of molten glass between a gob distributor scoop and a blank mold opening of a glassware forming machine. The apparatus is characterized by a trough having upper and lower ends, the upper end being pivotally mounted to the frame of the glassware forming machine for acuate movement in a horizontal plane. A deflector is also provided having upper and lower ends and including means associated with the deflector upper end for pivotally mounting the deflector. In addition, there is a holder mounted to the machine frame which receives the lower end of the trough with the trough positioned to extend downwardly between the scoop and the deflector at an acute angle with respect to the horizontal and with the lower end of the trough being aligned along a first axis. The apparatus is further characterized by having a deflector support means on the holder for pivotally mounting the upper end of the deflector to the holder and a carriage having first and second adjustment means for permitting respective longitudinal and transverse movement of the deflector relative to the first axis with the holder maintaining centerline alignment between the upper end of the deflector and the lower end of the trough during the longitudinal and transverse movement of the deflector on the carriage. A deflector exit adjustment means is also provided for pivotally adjusting the angular position of the lower end of the deflector relative to the entrace of the blank mold opening.

In a further aspect, the gob guide apparatus of the present invention may be characterized as having a trough having upper and lower ends with the upper end pivotally mounted to the frame of the glassware forming machine for arcuate movement in a horizontal plane, a deflector having upper and lower ends and including means associated with the deflector upper end for pivotally mounting the deflector, a holder mounted to the machine frame and receiving the lower end of the trough with the trough in a downwardly inclined position between the gob delivery scoop and the deflector and with the lower end of the trough being aligned along a first axis, a deflector support means on the holder for pivotally mounting the upper end of the deflector to the holder, and a carriage having first and second adjustment means for permitting respective longitudinal and transverse movement of the deflector relative to the first axis and with the holder maintaining centerline alignment between the upper end of the deflector and the lower end of the trough during the longitudinal and transverse movement of the deflector on the carriage.

In a yet further aspect of the present invention there is provided a gob guide apparatus for guiding the delivery of gobs of molten glass between a gob distributor scoop and a blank mold opening of a glassware forming machine. In this aspect, the invention is characterized by a trough having upper and lower ends with the upper end pivotally mounted to the frame of the glassware forming machine for arcuate movement in a horizontal plane, a deflector having upper and lower ends and including means associated with the deflector upper end for mounting the deflector, a holder mounted to the machine frame and receiving the lower end of the trough with the trough inclined downwardly between the scoop and the deflector with the lower end of the trough being aligned along a first axis, a deflector support means on the holder for mounting the deflector to the holder, a carriage having first and second adjustment means for permitting respective longitudinal and transverse movement of the deflector relative to the first axis with the holder maintaining centerline alignment between the upper end of the deflector and the lower end of the trough during the longitudinal and transverse movement of the deflector on the carriage, and a deflector exit adjustment means for adjusting the position of the lower end of the deflector relative to the entrance of the blank mold opening.

Accordingly, it is an object of the present invention to provide an improved gob delivery means for a glassware forming machine.

It is a further object of the present invention to provide an improved gob guide system which permits alignment of the position of the exit end of the deflector over the blank mold while maintaining the centerline alignment of the trough and deflector.

It is a further object of the present invention to provide an improved alignment apparatus for a gob delivery system having the above advantages and which additionally provides the gob deflector with a pivotal adjustment capability which adjusts the exit angle so as to permit the gobs to exit the deflector in a vertical direction.

An additional object of the present invention is to provide the above advantages while permitting the use of the existing deflector in retrofitting situations where the system is being installed on an existing glassware forming machine.

Related objects of the present invention will become even more apparent by reference to the following drawing figures and detailed description.

DESCRIPTION OF THE PREFERRED EMBODIMENT

Figure 1:
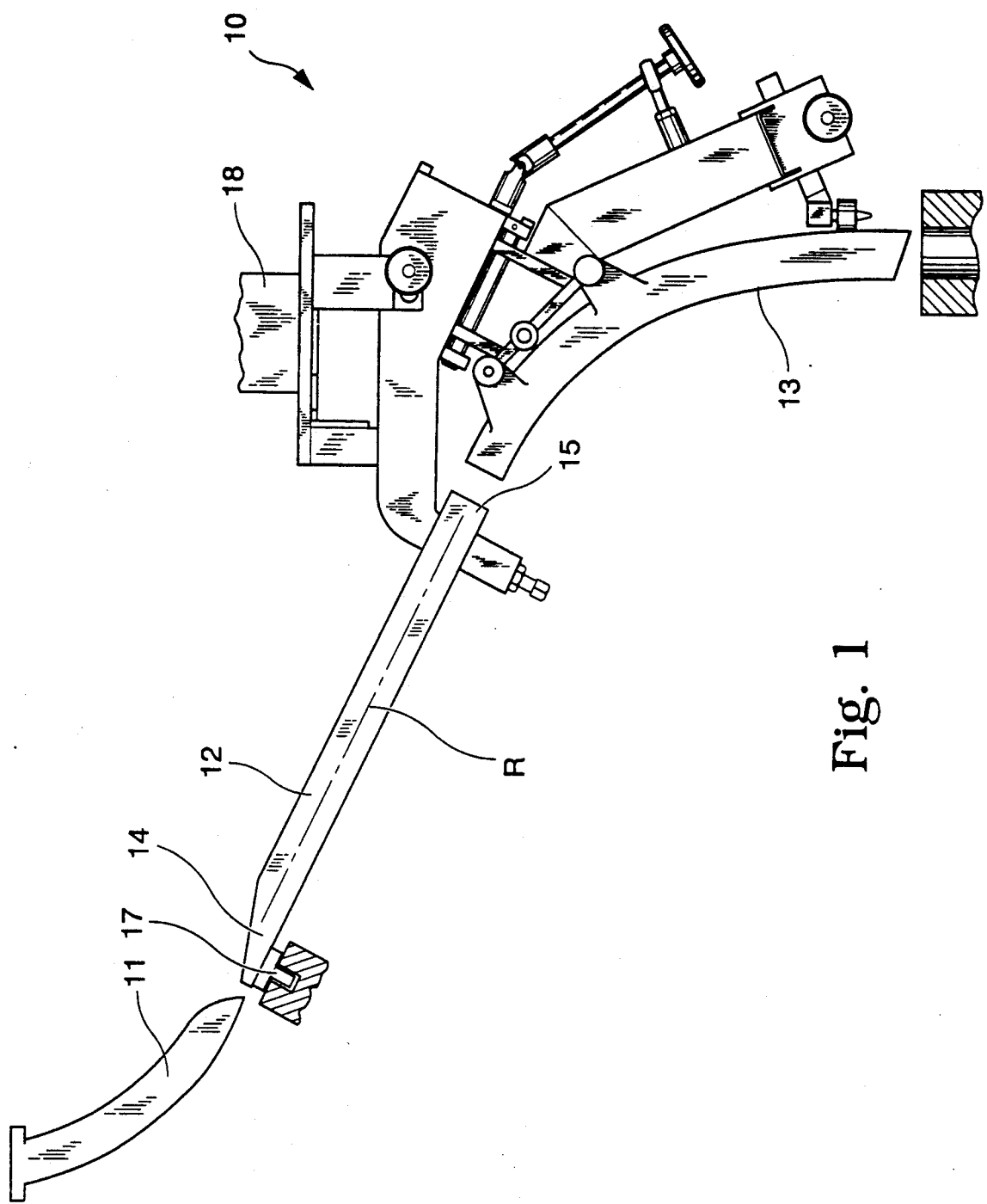
FIG. 1 is a schematic view showing the relationship between the gob distributor scoop, trough, deflector and blank mold opening.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 schematically depicts the gob guide apparatus generally designated at 10 in a position to guide the delivery of gobs of molten glass between the gob distributor scoop 11 and a blank mold opening of one section of a conventional individual section type glassware forming machine. The scoop 11 forms part of a conventional servo-driven single, double, or triple gob distributor system (not shown) which serves to distribute gobs of molten glass to the trough or troughs 12 corresponding to each section of the glassware forming machine. For sake of simplicity, only one scoop and associated trough is shown in FIG. 1. The gobs exit trough 12 at a downward angle and are thereafter guided by a deflector 13 for vertical entry into the corresponding blank mold opening.

Each of the troughs 12 are of conventional construction and have upper and lower ends 14 and 15, respectively. Each trough 12 is inclined downwardly so that the trough axis R of the lower or exit end 15 forms an acute angle relative to the horizontal. The length and angular orientation of each trough will vary depending upon the vertical and horizontal distances between the corresponding scoop 11 and blank mold opening. The upper end 14 of trough 12 is pivotally mounted at 17 to the frame 18 of the glassware forming machine to permit arcuate movement of the lower end 15 in a horizontal plane.

Figure 2:
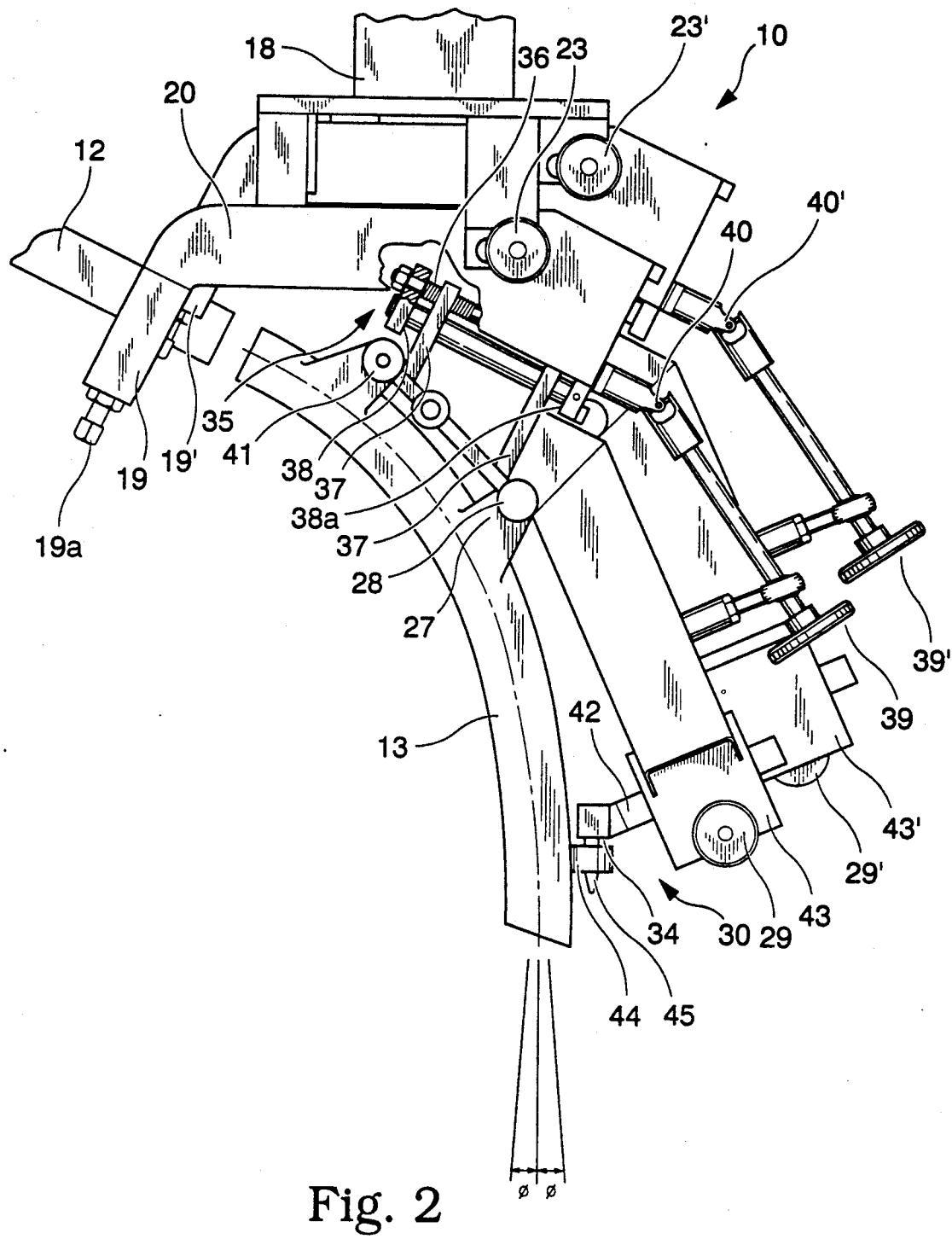
FIG. 2 is a fragmentary front elevation view of the gob guide apparatus of the present invention partially broken away to show internal features.
Figure 3:
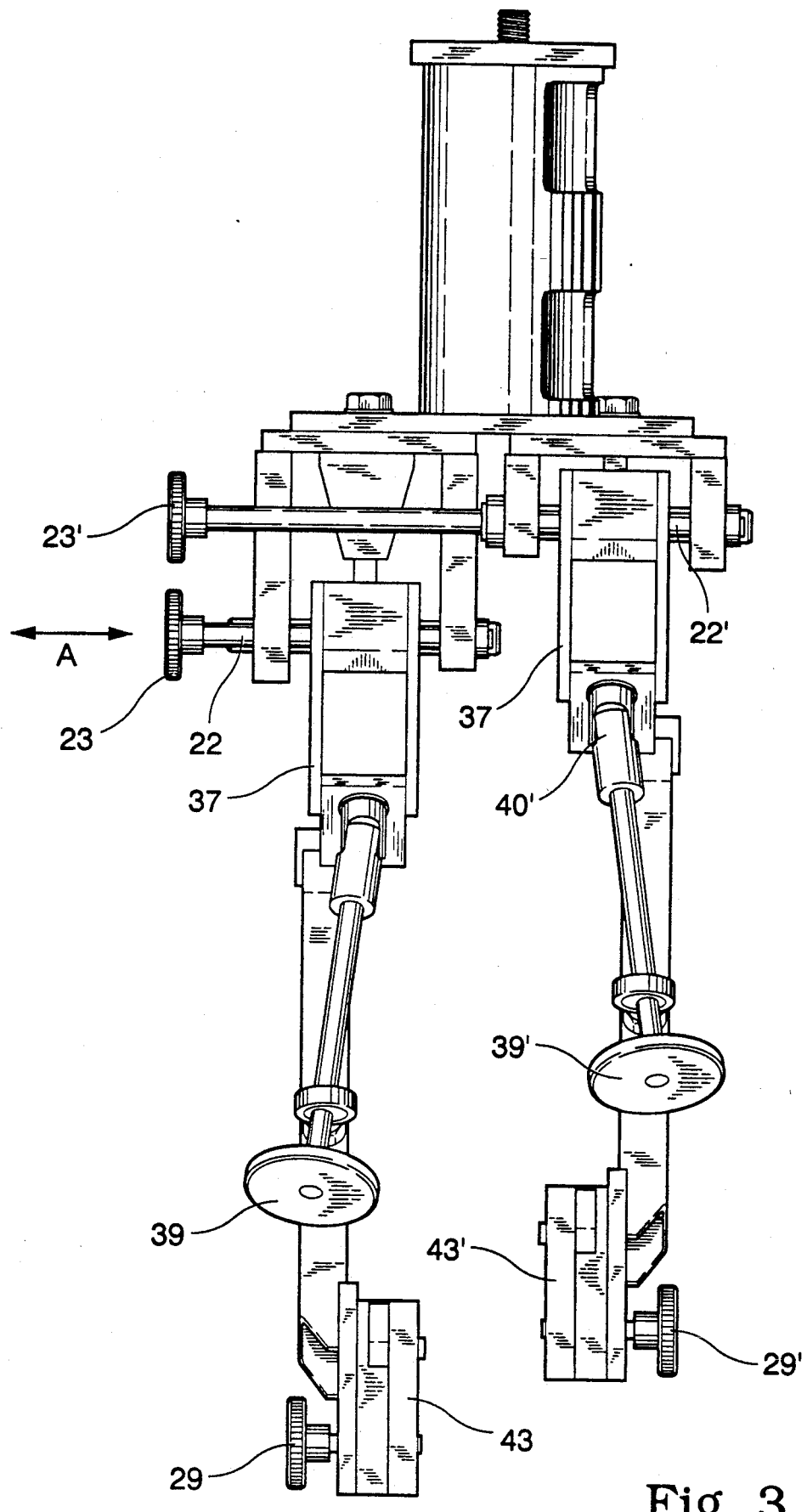
FIG. 3 is a right side elevation view of the gob guide apparatus of FIG. 1 with certain features omitted in order to more clearly show the carriage assembly.

Referring now to FIGS. 2 and 3, a mechanism for aligning a gob delivery system corresponding to a respective pair of upper and lower scoops such as would be used in a double gob distributor is shown generally designated at 10. While only the alignment mechanism associated with the lower scoop (not shown) and lower trough 12 will be described, it should be understood that the alignment mechanism associated with the upper scoop and upper trough (not shown) is substantially identical thereto. Elements corresponding to the upper scoop which are similar to those corresponding to the lower scoop are identified by identical primed reference numerals. The lower end of the trough 12 is loosely received in a trough support holder 19 extending substantially perpendicular to the trough axis R and forms part of a carriage assembly 20 mounted to a main hangar 18 fixedly attached to the machine frame. The holder 19 limits the arcuate travel of the lower end 15 of trough 12 as determined by the transverse movement limitations of carriage assembly 20. Limited positional adjustment of the lower end 15 of trough 12 in a vertical plane which serves to also slightly adjust the relative inclination of the trough axis R is provided by adjustment screw 19a.

Carriage assembly 20 is mounted to the machine frame via hangar 18 and provides limited transverse movement of holder 19 in the directions indicated by arrows A. In the preferred embodiment, the carriage assembly 20 is journably mounted on a threaded rod 22 with transverse adjustment being provided by manually a rotatable handwheel 23 in clockwise or counterclockwise directions. As an alternative to threaded rod 22, other suitable translation means such as slide ways may also be employed.

A longitudinal adjustment mechanism 35 is also provided on carriage assembly 20 for longitudinal movement of deflector 13 parallel trough axis R. Mechanism 35 includes a pair of deflector supports 37 journably mounted to an adjusting screw 36. Handwheel 39 actuates rotation of screw 36 via a universal coupling 40. Referring particularly to FIG. 2, translation of deflector 13 along axis R is limited in one direction by abutment of left support 37 against surface 38 and in the other direction by abutment of right support 37 against surface 39.

Deflector 13 is of conventional construction and is pivotally mounted to carriage assembly 20 at the upper end by a pin 41. Pivotal adjustment of deflector 13 is controlled at the lower exit end by deflector adjustment mechanism 30. Such movement is provided by clockwise and counterclockwise rotation of handwheel 29 which causes translation of a gear rack (not shown) on pin holder 42 via gear box 43 and relative movement of pin 45 while maintaining vertical orientation of pin 45 inside pin coller 44. Clockwise and counterclockwise pivotal movement of deflector 13 about pin 41 is limited by axial movement of pin holder 42 in generally leftward and rightward directions, respectively, as seen in FIG. 2 which is in turn limited by the length of the gear rack on pin holder 42. As seen in FIG. 2, deflector 13 is medially positioned relative to its range of pivotal movement on pin 41. When deflector 13 pivots about the pin 41 the boss 27 fixed to the deflector 13 will move on a surface behind pad 28 which is rigidly connected to bracket 37.

Some pivotal adjustment capability is needed to account for wear and manufacturing tolerances in the shape of deflector 13 which variations can cause gobs to exit the deflector 13 at an acute angle $\phi$ relative to vertical and may also be necessary with long deflectors to ensure proper gob contact with the deflectors. The amount of $\phi$ adjustment capability needed to compensate for such variations is fairly small, and it has been found that a maximum one degree adjustment either way from vertical is sufficient for this purpose. A one degree $\phi$ adjustment produces a maximum distance of movement of the exit end of deflector 13 in a horizontal direction of about $\frac{1}{8}''$ which can be compensated for by longitudinal adjustment of the position of deflector 13 by manipulation of handwheel 39.

The operation of the alignment system may be accomplished as follows. The exit end of trough 12 and entrance to deflector 13 are aligned by adjustment of screw 19a. The deflector exit is oriented vertically by pivotal adjustment mechanism 30 using handwheel 29 and then aligned over the corresponding blank mold opening by transverse movement of the deflector and trough and longitudinal movement of the deflector by manipulation of handwheels 39 and 23, respectively. If the gobs do not enter the blank mold opening precisely vertically or enter offset from the center of the opening, further compensating adjustments may be made. During such adjustments the trough pivots horizontally to compensate for deflector transverse movement, thereby maintaining centerline alignment between the exit end of the trough and the deflector entrance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gob guide apparatus in combination with a glassware forming machine having a machine frame, a gob distributor scoop and a blank mold having a mold opening for receiving gobs of molten glass, said gob guide apparatus guiding the delivery of gobs of molten glass between said gob distributor scoop and said blank mold opening of said glassware forming machine, said gob guide apparatus comprising:

a trough having upper and lower ends, said upper end pivotally mounted to the frame of said glassware forming machine for arcuate movement in a horizontal plane;

a deflector having upper and lower ends;

a carriage mounted to said machine frame and carrying said deflector, said carriage including a holder receiving the lower end of said trough and deflector support means for pivotally mounting the upper end of said deflector to said holder, said trough positioned to extend downwardly between said scoop and said deflector at an acute angle with respect to the horizontal with the lower end of said trough being aligned along a first axis, said carriage further having first and second adjustment means for permitting respective longitudinal and transverse movement of said deflector relative to said first axis, said holder maintaining centerline alignment between the upper end of said deflector and the lower end of said trough during said longitudinal and transverse movement of said deflector on said carriage; and a deflector exit adjustment means for pivotally adjusting the angular position of the lower end of said deflector relative to the entrance of said blank mold opening.

2. A gob guide apparatus in combination with a glassware forming machine having a machine frame, a gob distributor scoop and a blank mold having a mold opening for receiving gobs of molten glass, said gob guide apparatus guiding the delivery of gobs of molten glass between said gob distributor scoop and said blank mold opening of said glassware forming machine, said gob guide apparatus comprising:

- a trough having upper and lower ends, said upper end pivotally mounted to the frame of said glassware forming machine for arcuate movement in a horizontal plane;
- a deflector having upper and lower ends and including means associated with said deflector upper end for pivotally mounting said deflector; and
- a carriage mounted to said machine frame and carrying said deflector, said carriage including a holder receiving the lower end of said trough and deflector support means on said holder for pivotally mounting the upper end of said deflector to said holder, said trough positioned to extend downwardly between said scoop and said deflector at an acute angle with respect to the horizontal with the lower end of said trough being aligned along a first axis, said carriage further having first and second adjustment means for permitting respective longitudinal and transverse movement of said deflector relative to said first axis, said holder maintaining centerline alignment between the upper end of said deflector and the lower end of said trough during said longitudinal and transverse movement of said deflector on said carriage.

3. A gob guide apparatus in combination with a glassware forming machine having a machine frame, a gob distributor scoop and a blank mold having a mold opening for receiving gobs of molten glass said gob guide apparatus guiding the delivery of gobs of molten glass between said gob distributor scoop and said blank mold opening of said glassware forming machine, said gob guide apparatus comprising:

- a trough having upper and lower ends, said upper end pivotally mounted to the frame of said glassware forming machine for arcuate movement in a horizontal plane
- a deflector having upper and lower ends;
- a carriage mounted to said machine frame and carrying said deflector, said carriage including a holder receiving the lower end of said trough and deflector support means on said holder for pivotally mounting the upper end of said deflector to said holder, said trough positioned to extend downwardly between said scoop and said deflector at an acute angle with respect to the horizontal with the lower end of said trough being aligned along a first axis, said carriage further having first and second adjustment means for permitting respective longitudinal and transverse movement of said deflector relative to said first axis, said holder maintaining centerline alignment between the upper end of said deflector and the lower end of said trough during said longitudinal and transverse movement of said deflector on said carriage; and
- a deflector exit adjustment means for adjusting the position of the lower end of said deflector relative to the entrance of said blank mold opening.

* * * * *

UNITED STATES PATENT AND TRADEMARK OFFICE
CERTIFICATE OF CORRECTION

PATENT NO. : 5,254,150

DATED : October 19, 1993

INVENTOR(S) : Robert F. Riemer et al.

It is certified that error appears in the above-indentified patent and that said Letters Patent is hereby corrected as shown below:

Col. 2, line 50, change "acuate" to --arcuate--.

Col. 3, line 4, change "entrace" to --entrance--.

Col. 8, line 9, insert --;-- after "plane".

Signed and Sealed this

Nineteenth Day of March, 1996

Attest:

BRUCE LEHMAN

*Attesting Officer*  *Commissioner of Patents and Trademarks*